United States Patent [19]

Hayami et al.

[11] 4,092,488
[45] May 30, 1978

[54] CONNECTION OR TERMINAL PORTIONS FOR CROSS-LINKED POLYETHYLENE CABLES

[75] Inventors: Toshiyuki Hayami; Hironaga Matsubara; Shousuke Yamanouchi, all of Osaka, Japan

[73] Assignee: Sumitomo Electric Industries, Ltd., Osaka, Japan

[21] Appl. No.: 625,623

[22] Filed: Oct. 24, 1975

[51] Int. Cl.² ............... H02G 15/02; D03D 13/00; D02G 3/00
[52] U.S. Cl. ............... 174/84 R; 428/222; 428/377; 428/383; 428/515; 428/516; 428/517; 428/518; 428/522; 156/49; 156/53; 174/110 PM
[58] Field of Search ............ 428/222, 377, 383, 522, 428/515–518; 174/84 R, 73 R, 110 PM; 156/49, 53

[56] References Cited

U.S. PATENT DOCUMENTS

| | | | |
|---|---|---|---|
| 3,527,874 | 9/1970 | Hayami | 174/24 |
| 3,617,419 | 11/1971 | Fischer | 428/516 X |
| 3,684,821 | 8/1972 | Miyauchi et al. | 174/102 SC |
| 3,777,048 | 12/1973 | Traut | 174/84 R X |
| 3,840,694 | 10/1974 | Luczak | 174/120 SC |

FOREIGN PATENT DOCUMENTS 15,467   7/1969   Japan ..................... 174/84 R

*Primary Examiner*—P. C. Ives
*Attorney, Agent, or Firm*—Sughrue, Rothwell, Mion, Zinn and Macpeak

[57] ABSTRACT

In the connection or terminal portions of cross-linked polyethylene cables produced by winding irradiated tapes around the connection or terminal portions of cross-linked polyethylene insulated cables and heat molding the same, the irradiated tapes comprise polyethylene and/or an ethylene copolymer as a base resin plus an ethylene-vinyl acetate copolymer containing more than about 15% vinylacetate (VA) in an amount which provides more than an about 2.5% VA content in the irradiated tapes.

6 Claims, 1 Drawing Figure

U.S.Patent May 30, 1978 4,092,488
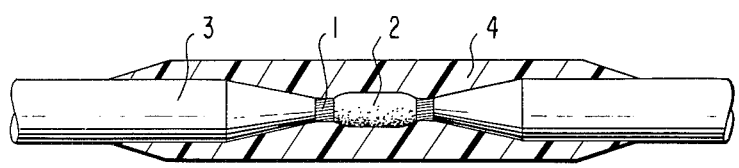

CONNECTION OR TERMINAL PORTIONS FOR CROSS-LINKED POLYETHYLENE CABLES

BACKGROUND OF THE INVENTION

1. Field of the Invention

The present invention relates to molded connection or terminal portions of cross-linked polyethylene insulated cables.

2. Description of the Prior Art

To form molded connections for cross-linked polyethylene insulated cables, known methods generally comprise subjecting a polyethylene tape to electron beam irradiation to effect cross-linking, winding the irradiated polyethylene tape around a cable and then heat molding the resulting assembly. The use of irradiated polyethylene which has been subjected to partial cross-linking permits satisfactory molding since no eccentricity, deformation or the like is caused by heating, and the initial breaking or separation characteristics of the molds are superior as compared with the use of uncross-linked polyethylene. On the other hand, complete fusion between layers of the tape or between the tape and the cable insulators cannot be expected by this method. As a result, after long times under high temperature, in particular after immersion in water for long times under an applied voltage, those portions which are not completely fused some time produce water trees (or electrochemical trees, as they are sometimes termed) to cause dielectric breakdown.

Most particularly, foreign particles wound between layers of tape tend to form nuclei around which water trees develope into the tapes remarkably.

SUMMARY OF THE INVENTION

The object of the present invention is, therefore, to overcome the above defects and to provide good molded connection or terminal portions of cables.

The primary feature of the present invention lies in the use, as a molded dielectric layer, of a composition which comprises polyethylene and/or ethylene copolymer blended with an ethylene-vinyl acetate copolymer of more than about 15% by weight VA content the ethylene-vinyl acetate copolymer being present in such an amount as to provide a more than about 2.5% by weight VA content in the composition. The composition is shaped into a tape and then irradiated with electron beams.

By winding the irradiated tape obtained as above around a connection or terminal portion of a cable, for example, as shown in the drawing, and heat molding, a molded dielectric connection layer 4 which is completely fused to cable conductor 1, connection sleeve 2 and dielectric cross-linked polyethylene layer 3 can be obtained in which no trees (such as electric or water trees) are present or will develop to thereby produce a connection portion with excellent characteristics for long-term immersion in water under applied voltages.

DESCRIPTION OF THE ACCOMPANYING DRAWING

The drawing is a schematic cross-sectional view of a connection portion of a cable according to the present invention.

DETAILED DESCRIPTION OF THE INVENTION

The polyethylene used in the present invention is not especially limited, but highly superior results are obtained with polyethylene of a melt index of about 0.1 to about 40, preferably 1 to 2 and a density ($\rho$) of 0.91 to 0.96, preferably 0.91 to 0.94. In a similar manner, highly preferred ethylene-vinyl acetate copolymers used in the present invention have a melt index of about 0.6 to about 70 and a density of 0.92 to 0.98.

In the present invention, the vinyl acetate content in the ethylene-vinyl acetate copolymer is preferably about 15% by weight to about 50% by weight and the vinyl acetate content in the final blend is preferably about 2.5% by weight to about 13% by weight. The ratio of ethylene-vinyl acetate copolymer to polyethylene (EVA/PE) is preferably about 1/20 to about 6/1 on weight basis.

The term "ethylene copolymer" as used herein as a base resin means an ethylene copolymer comprising predominantly the ethylene component, for example, more than about 95% by weight ethylene, such as an ethylene-propylene copolymer, an ethylene-acrylate copolymer, e.g., ethylene-methyl acrylate copolymer, ethylene-ethyl acrylate copolymer or the like, an ethylene-styrene copolymer and the like, preferably an ethylene-acrylic acid copolymer.

There is no special limitation on the comonomer used to form a copolymer with ethylene when high ethylene percentages are used, e.g., more than about 95% by weight ethylene.

The compositions of this invention can be compounded by a conventional procedure, for example, using rolls, which is well known in the art.

The tape produced in accordance with the present invention for most commonly encountered commercial applications generally has a thickness of about 0.1 to 10 mm, preferably 0.1 to 0.2 mm. The tape is cross-linked by irradiation with, for example, electron beams at an intensity of about 1 to about 10 Mrad, preferably 1 to 2 Mrad, to a degree of gelation of about 20 to about 50%.

The resulting tape is then wound around a cable and can be heat molded in a conventional manner, for example, at a temperature of about 120° C to about 200° C for a period of about 2 to about 8 hours under a pressure of more than about 3 Kg/cm$^2$. For example, in XLPE 3–6 KV cables, heat molding is effected at a temperature of 130° C for 2 hours and at a temperature of 200° C for 4 hours under a pressure of 4.6 Kg/cm$^2$.

PREFERRED EMBODIMENTS OF THE INVENTION

The present invention will now be described in detail by way of preferred embodiments thereof and with reference to several comparison examples. All percentages in Table 1 is by weight.

EXAMPLE 1-11

Polyethylene and ethylene-vinyl acetate copolymer as shown in Table 1 were compounded in the ratio specified in Table 1 using a roll at a temperature of 120° C for 20 minutes and formed into tapes having a thickness of 0.2 mm and a width of 25 mm in a conventional manner. The resultant tapes were irradiated with electron beams to a degree of gelation of 30% in a conventional manner, wound around 3.3 Kv cables of a 100 mm$^2$ diameter insulated with cross-linked polyethylene and molded under heating (at 130° C for 2 hours plus at 200° C for 4 hours under a pressure of 3.4 Kg/cm² to form connection portions having a total thickness (overall dimensions of the layer of one tape on the conductor of 3.2 mm.

The cables were then immersed in water at normal temperature for 1000 hours under an applied voltage of 60 Kv. The cables were then disassembled, and thereafter the development of trees examined, the results of which are shown in Table 1.

COMPARISON EXAMPLES 1, 2 and 5

The connection portions of cables were prepared in the same manner as in Example 1, except that polyethylene alone was substituted for the mixture of polyethylene and the ethylene-vinyl acetate copolymer as shown in Table 1, and the characteristics of the resultant connection portions were measured as for Examples 1–11. The results are shown in Table 1.

COMPARISON EXAMPLES 3 and 4

The connection portions of cables were prepared in the same manner as in the Example 1, except that an ethylene-vinyl acetate copolymer alone was substituted for the mixture of polyethylene and ethylene-vinyl acetate copolymer as shown in Table 1, and the characteristics of the connection portions measured, the result of which are shown in Table 1.

and the time required for breakdown observed. While the connection portions of Comparison Example 1 showed dielectric breakdown in 334 hours, the connection portions of Example 1 withstood the indicated voltage for more than 1,000 hours.

As is apparent from the foregoing results, while compositions containing only polyethylene or only an ethylene-vinyl acetate copolymer provide unsatisfactory characteristics, those containing a blend of polyethylene and an ethylene-vinyl acetate copolymer within the present invention provide highly preferred results.

A VA content in the ethylene-vinyl acetate copolymer less than 15% does not provide the advantageous effects of the present invention; the VA content preferably ranges between about 20 and about 40%.

The proportion of the ethylene-vinyl acetate to the polyethylene should not be too low in view of the VA content reauired to attain the objects of this invention, and the VA content in the composition should be at least 2.5%, preferably, in the range of from 2.5 to 20% and most preferably from 10–12.5%. Within the VA content range specified above, satisfactory cable connection or terminal portions having excellent electric characteristics as well as being free of the development of trees can be obtained.

As is apparent from Comparison Examples 3 and 4, the use of ethylene-vinyl acetate copolymer alone shows substantially no effect even with the same VA Table 1

| | Base resin | Type of EVA*[4] added | Melt Index & Density ($\rho$) of VA | Amount of EVA added | VA*[5] composition (%) | Gelation after irradiation (%) | Water tree*[6] |
|---|---|---|---|---|---|---|---|
| Comparison Example 1 | PE*[1] M.I.*[2]=1.0 $\rho$*[3]=0.93 | — | — | — | — | 50 | X |
| 2 | PE M.I.=1.0 $\rho$=0.92 | — | — | — | — | 20 | X |
| Example 1 | PE M.I.=1.0 $\rho$=0.92 | VA content=25% | M.I.=3 $\rho$=0.95 | PE/EVA =90/10 | 2.5 | 30 | O |
| 2 | " | " | " | 80/20 | 5.0 | 30 | O |
| 3 | " | " | " | 60/40 | 10 | 30 | O |
| 4 | " | " | " | 50/50 | 12.5 | 30 | O |
| 5 | " | 30% | M.I.=20 $\rho$=0.95 | 80/20 | 6.0 | 30 | O |
| 6 | " | 35% | M.I.=60 $\rho$=0.96 | 80/20 | 7.0 | 30 | O |
| 7 | " | 45% | M.I.=60 $\rho$=0.97 | 80/20 | 9.0 | 30 | O |
| 8 | " | 15% | M.I.=0.6 $\rho$=0.94 | 80/20 | 3.0 | 30 | O |
| Comparison Example 3 | EVA VA=10% | — | — | — | 10 | 30 | X |
| 4 | EVA VA=25% | — | — | — | 25 | 30 | Δ |
| Example 9 | EVA VA=5% | 25% | M.I.=3 $\rho$=0.93 | 90/10 | 7.5 | 30 | O |
| 10 | PE M.I.=1.0 $\rho$=0.92 | 25% | M.I.=3 $\rho$=0.95 | 80/20 | 5.0 | 50 | O |
| 11 | PE M.I.=1.0 $\rho$=0.96 | 25% | M.I.=3 $\rho$=0.95 | 80/20 | 5.0 | 30 | O |
| Comparison Example 5 | PE M.I.=1.0 $\rho$=0.96 | — | — | — | — | 30 | X |

*[1]PE: Polyethylene
*[2]M.I.: Melt Index, determined according to JIS-K6760-1966
*[3]$\rho$: Density
*[4]EVA: Ethylene-vinyl acetate copolymer
*[5]VA content: Vinyl acetate content (% in the final blend composition
*[6]X: Trees occur
  Δ: Trees occur a little
  O: No tree occurs The connection portions produced as in Example 1 and as in Comparison Example 1 were immersed in water at 70° C and a voltage of 100 Kv applied thereto, content as in the compositions of the present invention comprising two components, and, therefore, an ethylene-vinyl acetate copolymer of a higher VA content is required to obtain a similar effect. A higher VA content, however, degrades other electrical properties of the connection portions such as dielectric tan δ, inpulse withstanding voltage and the like, rendering them impractical for commercial use.

It is clear from Table 1 that the gelation rate has no substantial effect on the characteristics, and further that high density polyethylene and ethylene-vinyl acetate copolymers as well as low density polyethylene can be used as the base resin.

Ethylene copolymers that can also be used in this invention as a substitute for polyethylene include ethylene-acrylate copolymers, ethylene-propylene copolymers, ethylene-acrylate graft copolymers and the like.

As will be apparent to those skilled in the art, the compositions used to form the tape can contain, if desired, anti-oxidants such as 4,4'-thiobis(6-tert-butyl-m-cresol), stabilizers, cross-linking agents, fillers, and the like generally in an amount of 0.1 to 0.5% by weight, depending upon the characteristics desired.

Although the foregoing description has been made for application to cable connection portions, it should be understood that the present invention can also be applied to the terminal portions of cables.

While the invention has been described in detail and with reference to specific embodiments thereof, it will be apparent to one skilled in the art that various changes and modifications can be made therein without departing from the spirit and scope thereof.

What is claimed is:

1. In the connection or terminal portions of cross-linked polyethylene-insulated cables produced by winding a tape around the connection or terminal portions of the cables and heatmolding the same, the improvement wherein said tapes comprise a blend of polyethylene and/or ethylene copolymer selected from the group consisting of ethylene-propylene copolymers, ethylene-methyl acrylate copolymers, ethylene-ethyl acrylate copolymers, ethylene-styrene copolymers and ethylene-acrylic acid copolymers plus an ethylene-vinyl acetate copolymer having a vinyl acetate of content of more than 15% present in an amount as to provide a vinyl acetate content of more than about 2.5% in said tape, which tape has been electron beam irradiated to a degree that the degree of gelation of said tape is about 20 to about 50%.

2. Connection or terminal portions of cross-linked polyethylene insulated cables as claimed in claim 1, wherein said blend comprises polyethylene and/or an ethylene copolymer having a melt index of about 0.1 to about 40 and a density of 0.91 to 0.98 plus an ethylene-vinyl acetate copolymer having a vinyl acetate content of about 15 to about 50% present in an amount as to provide a vinyl acetate content of about 2.5 to about 13% in said tapes, and said tape has a thickness of about 0.1 to about 1.0 mm and has been irradiated with electron beams at about 1 Mrad to about 10 Mrad.

3. Connection or terminal portions of cross-linked polyethylene insulated cables as claimed in claim 2, wherein the wound tape is heat molded at a temperature of about 120° C to about 270° C.

4. Connection or terminal portions of cross-linked polyethylene insulated cables as claimed in claim 1, wherein said ethylene-vinyl acetate copolymer has a melt index of about 0.6 to about 70 and a density of 0.92 to 0.98.

5. Connection or terminal portions of cross-linked polyethylene insulated cables as claimed in claim 4, wherein the ratio of ethylene-vinyl acetate copolymer to polyethylene is from about 1/20 to about 6/1, weight basis.

6. Connection or terminal portions of cross-linked polyethylene insulated cables as claimed in claim 1, wherein said ethylene copolymer comprises more than about 95% by weight ethylene.

* * * * *